May 6, 1941.  E. W. SIBLEY  2,241,004
WINDSHIELD CLEANER MOTOR
Filed March 6, 1939   2 Sheets-Sheet 1
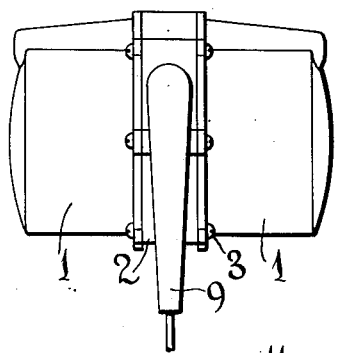
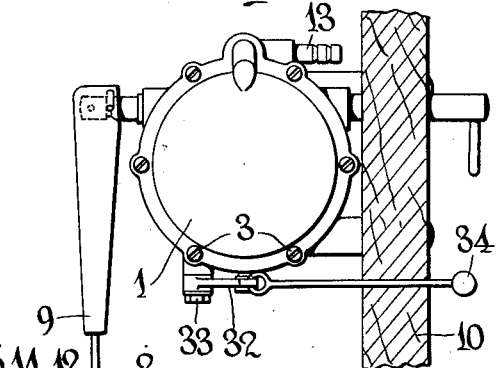
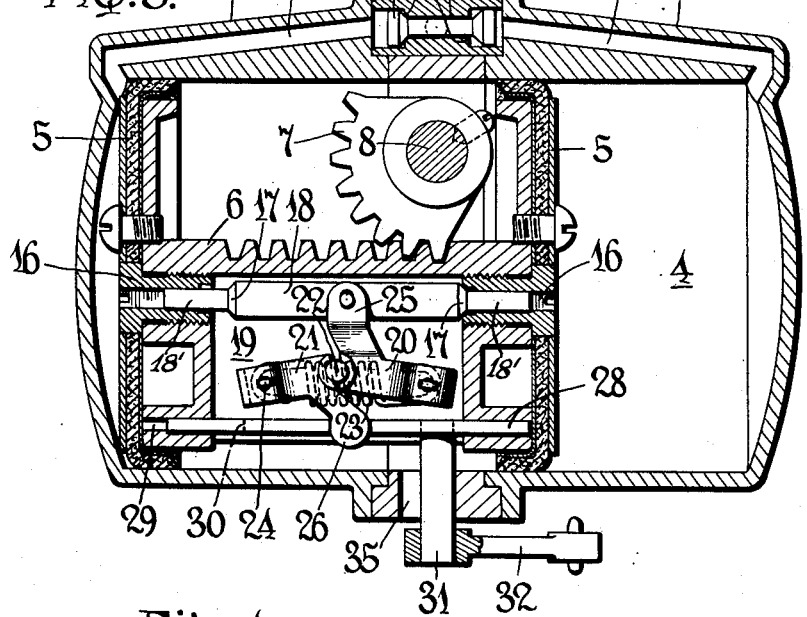
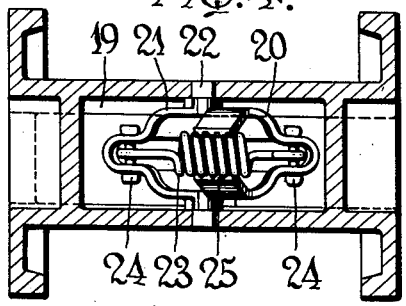
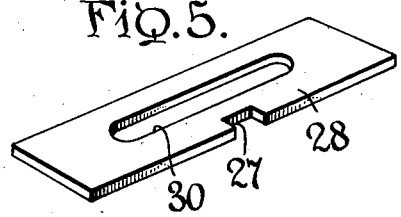
INVENTOR
Edward W. Sibley,
BY
Beau, Brooks, Buckley & Beau.
ATTORNEYS Patented May 6, 1941

2,241,004

UNITED STATES PATENT OFFICE 2,241,004

WINDSHIELD CLEANER MOTOR

Edward W. Sibley, Kenmore, N. Y., assignor to Trico Products Corporation, Buffalo, N. Y.

Application March 6, 1939, Serial No. 260,006

7 Claims. (Cl. 121—123)

This invention relates to a windshield cleaner and primarily to a fluid pressure operated motor such, for example, as the suction operated type which is coupled to the intake manifold as a source of low pressure.

The invention has for its primary object to provide a windshield cleaner motor of efficient design and construction and, further, one which is compact in size while at the same time providing ample power for the reciprocation of the windshield wiping squeegee in an efficient manner. More particularly the invention involves the location of the automatic snap action type of valve mechanism on the moving piston for conserving space and thereby decreasing the overall dimensions of the motor.

Other salient features of construction and arrangements of parts will manifest themselves as the description progresses during which references will be made to the accompanying drawings, wherein—

Fig. 1 is a front elevation and Fig. 2 a side elevation of a motor constructed in accordance with the present invention;

Fig. 3 is a longitudinal sectional view through the motor;

Fig. 4 is a horizontal sectional view more clearly depicting the snap action for the valve mechanism;

Fig. 5 is a detailed perspective view of the tripping plate;

Figure 6:
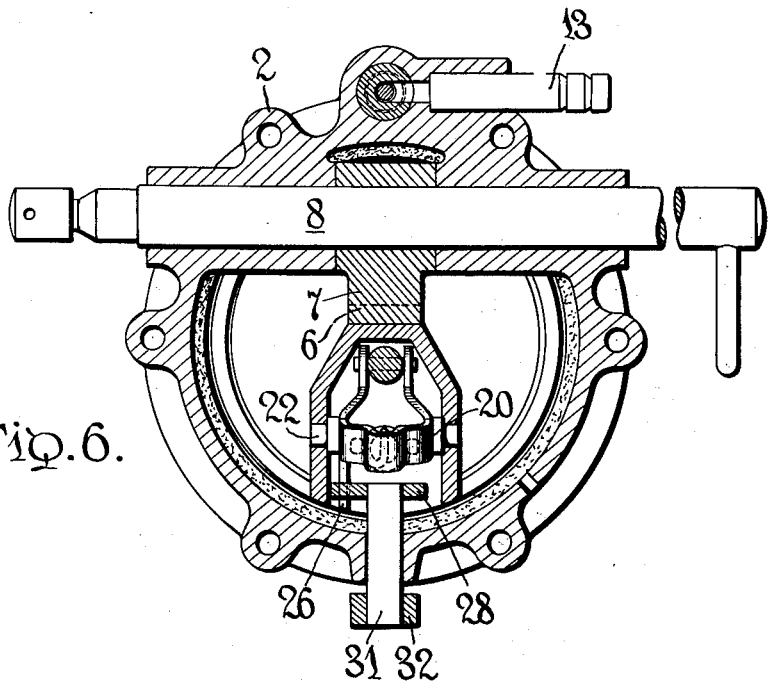
Fig. 6 is a transverse sectional view through the central portion of the motor.

Referring more particularly to the drawings, the motor housing for the sake of illustration is shown as being formed of a pair of cupped members 1 placed in opposing relation against the opposite sides of a central mounting section 2 to which they are secured by fasteners 3. The cupped members may be die cast and cooperate with the central mounting section to form a chamber 4 in which operates the piston unit which comprises a pair of piston members 5 joined by a rigid rack bar 6, the teeth of the rack bar meshing with those of the segmental gear 7 which is fixed to the motor shaft 8. This shaft serves to actuate the wiper carrying arm 9 by which the squeegee, not shown, is reciprocated over the windshield, generally indicated at 10. The opposite ends of the motor chamber 4 are exhausted through exhaust passages 11 which open into a valve chamber 12 which is provided with a nipple 13 adapted to be connected by a hose to the intake manifold or other suitable source of low pressure. The valve chamber is provided with oppositely facing seats 14 with which the valve parts 15 are adapted to alternately engage in the presence of predetermined pressure differential.

Figure 7:
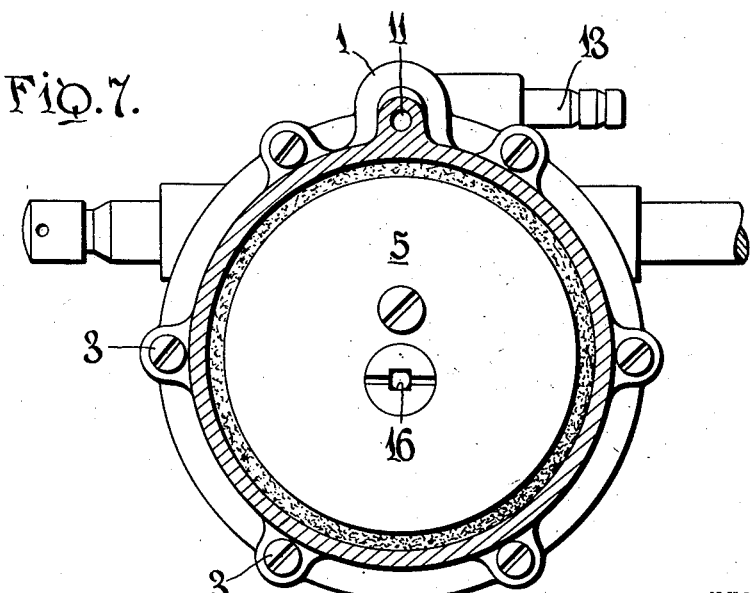
Fig. 7 is a similar view through the motor cylinder beyond the piston.

The chamber 4 between the piston members 5 is open to atmospheric pressure so as to provide the required pressure differential to motivate the piston, and in order to operatively apply the atmospheric pressure to the piston each piston member is provided with a valved port 16 adapted to be closed by a valve 17 under the influence of an automatic valve action. The ports 16 are designed to establish communication with the opposite ends of chamber 4. The valves 17 are conveniently formed on the opposite ends of a connecting bar 18 so that when one valve seats the companion valve will unseat. Each end of the bar is continued beyond the respective valve 17 to form a guiding extension 18' which is circular in cross section to provide clearance in the square sectioned port opening 16 (Fig. 7) for the ready passage of air through the port when its valve is unseated.

The snap action for the operation of the valves 17 is located within a compartment 19 formed in the piston unit and comprises a pair of yokes 20 and 21 pivotally mounted in opposed order on trunnions 22. A spring 23 is anchored at its opposite ends on cross pins 24 carried by the yokes and is designed for having one end portion moved beyond a dead center or a position of maximum spring distortion or extension in order to enable the movement of the companion yoke by the spring. The yoke 20 is provided with a pair of upstanding arms 25 straddling the bar 18 and connected therewith so as to shift the bar axially for effecting the desired valving of the ports 16. The other yoke 21 is formed with a depending lug 26 engageable in a marginal notch 27 formed in a tripping plate 28, the latter being slidably carried in guide ways 29 of the piston unit for limited movement and itself formed with an elongated opening 30 in which engages a control pin 31. This control pin is carried by a lever 32 pivoted at 33 on the motor and is accessible to the motorist by a handle 34.

The operation of the valve action is such that when an end of the opening or slot 30 engages the control pin 31 it will arrest the tripping plate while the piston continues to move and thereby swing the lug 26 in a position to move the line of spring force to the opposite side of the yoke mounting, whereupon the spring will snap one valve 17 from its seat and engage the companion valve with its seat to reverse the atmospheric communications.

With the parts arranged as shown in Fig. 3 the pressures on the opposite side of the left piston member are equalized by reason of the open port 16 which also admits atmospheric pressure through the left passage 11 to seat the left valve 15 and open the right valve 15 to the suction line to exhaust the air from chamber 4 at the right of the piston unit. The pressure differential on the right piston member 5 will move the piston to the right until the left end of the slot 30 engages the control pin 31 and reverses the valve 17 whereupon the atmospheric pressure entering the right end of chamber 4 will act on the right valve 15 to seat the same and simultaneously unseat the left valve 15. The operation of the motor is generally similar to that shown in Patent No. 2,209,921 granted July 30, 1940 to Erwin C. Horton.

For parking the wiper at one end of its path of movement the control pin is shifted about its pivotal mounting 33 within a slot 35 in the housing to prevent the end of the slot 30 engaging such pin and consequently the valve action will fail to function. This results in the piston being fluid locked at the respective end of its movement.

By reason of the disposition of the automatic snap action on the piston the intermediate space between the piston members 5 may be considerably reduced so that the over-all length of the motor may likewise be contracted without detracting from the power or efficiency of the motor.

It will be understood further that the construction described and shown herein is merely illustrative of the inventive principles herein involved, which may be applied to other physical embodiments without departing from the scope and spirit of the invention claimed.

I claim:

1. A windshield cleaner motor of the fluid pressure differential type, comprising a motor chamber having terminal passages communicating through oppositely facing valve seats with one pressure, valve means alternately engageable with the seats, a piston unit mounted for reciprocatory movement within the chamber comprising spaced piston members each having a port for establishing communication between the opposite sides of its piston member, the space between the piston members being in communication with a different pressure, valve means for opening one while closing the other of the piston ports, a snap action carried by the piston for reversing the latter valve means, and means carried by the chamber for tripping the snap action as the piston unit approaches its limit of movement.

2. A windshield cleaner motor comprising a motor chamber having terminal passages communicating through oppositely facing valve seats with a source of suction, valve means alternately engageable with the seats, a piston unit mounted for reciprocatory movement within the chamber comprising spaced piston members each having a port for establishing communication between the opposite sides of its piston member, valve means for opening one while closing the other of the piston ports, a snap action carried by the piston for reversing the latter valve means, and means carried by the chamber for tripping the snap action, said trip means being adjustable to a non-tripping position for arresting the piston unit at one limit position.

3. A windshield cleaner motor comprising a motor chamber having terminal passages communicating through oppositely facing valve seats with a source of suction, valve means alternately engageable with the seats, a piston unit mounted for reciprocatory movement within the chamber comprising spaced piston members each having a port for establishing communication between the opposite sides of its piston member, valve means for opening one while closing the other of the piston ports, a snap action carried by the piston for reversing the latter valve means, a tripping plate movably carried by the piston unit and operatively connected to the snap action for effecting operation of the latter when the tripping plate is arrested during movement of the piston unit, and means for so arresting the tripping plate.

4. A windshield cleaner motor comprising a motor chamber having terminal passages communicating through oppositely facing valve seats with a source of suction, valve means alternately engageable with the seats, a piston unit mounted for reciprocatory movement within the chamber comprising spaced piston members each having a port for establishing communication between the opposite sides of its piston member, valve means for opening one while closing the other of the piston ports, a snap action carried by the piston for reversing the latter valve means, a tripping plate movably carried by the piston unit and operatively connected to the snap action for effecting operation of the latter when the tripping plate is arrested during movement of the piston unit, and means for so arresting the tripping plate, said arresting means being adjustable to an inoperative position to avoid arresting the tripping plate whereby the piston unit will be fluid locked at one limit of its movement.

5. A windshield cleaner motor comprising a motor chamber, a piston unit mounted for reciprocatory movement within the chamber comprising spaced piston members each having a port for establishing communication between the opposite sides of its piston member, valve means for opening one while closing the other of the piston ports, a snap action carried by the piston for reversing the valve means, means cooperating with the valve means to provide a pressure differential for the operation of the motor, a tripping plate movably carried by the piston unit and operatively connected to the snap action for effecting operation of the latter when the tripping plate is arrested during movement of the piston unit, and means for so arresting the tripping plate.

6. A windshield cleaner motor comprising a motor chamber, a piston unit mounted for reciprocatory movement within the chamber comprising spaced piston members each having a port for establishing communication between the opposite sides of its piston member, valve means for opening one while closing the other of the piston ports, a snap action carried by the piston for reversing the valve means, means cooperating with the valve means to provide a pressure differential for the operation of the motor, a tripping plate movably carried by the piston unit and operatively connected to the snap action for effecting operation of the latter when the tripping plate is arrested during movement of the piston unit, and means for so arresting the tripping plate, said arresting means being adjustable to an inoperative position to avoid arresting the tripping plate whereby the piston unit will be fluid locked at one limit of its movement.

7. In a motor, a chamber and piston means movable therein, valve means for alternately admitting one pressure to the opposite sides of the chamber and snap action means actuated by the movement of the piston means for shifting said valve means when the piston means approaches the terminal phase of each operating stroke thereof, and valve means operable in response to the differential pressure at the opposite sides of the chamber for alternately opening said opposite sides of the chamber to another pressure.

EDWARD W. SIBLEY.